4 Sheets—Sheet 1.

G. M. MORRIS & J. P. HOLLENBECK.
Button-Hole Attachment for Sewing-Machines.

No. 203,287. Patented May 7, 1878.

WITNESSES.
J. E. Schoonmaker
J. H. Riordan

INVENTOR.
George M. Morris
Joseph P. Hollenbeck
By N. Davenport Atty

N. PETERS, PHOTO-LITHOGRAPHER, WASHINGTON, D. C.

G. M. MORRIS & J. P. HOLLENBECK.
Button-Hole Attachment for Sewing-Machines.

No. 203,287. Patented May 7, 1878.

4 Sheets—Sheet 3.

G. M. MORRIS & J. P. HOLLENBECK.
Button-Hole Attachment for Sewing-Machines.

No. 203,287. Patented May 7, 1878.

WITNESSES,
J. E. Schoonmaker
J. H. Riordan

INVENTOR,
George M. Morris
Joseph P. Hollenbeck
By N Davenport atty

N. PETERS, PHOTO-LITHOGRAPHER, WASHINGTON, D. C.

4 Sheets—Sheet 4.
G. M. MORRIS & J. P. HOLLENBECK.
Button-Hole Attachment for Sewing-Machines.
No. 203,287. Patented May 7, 1878.
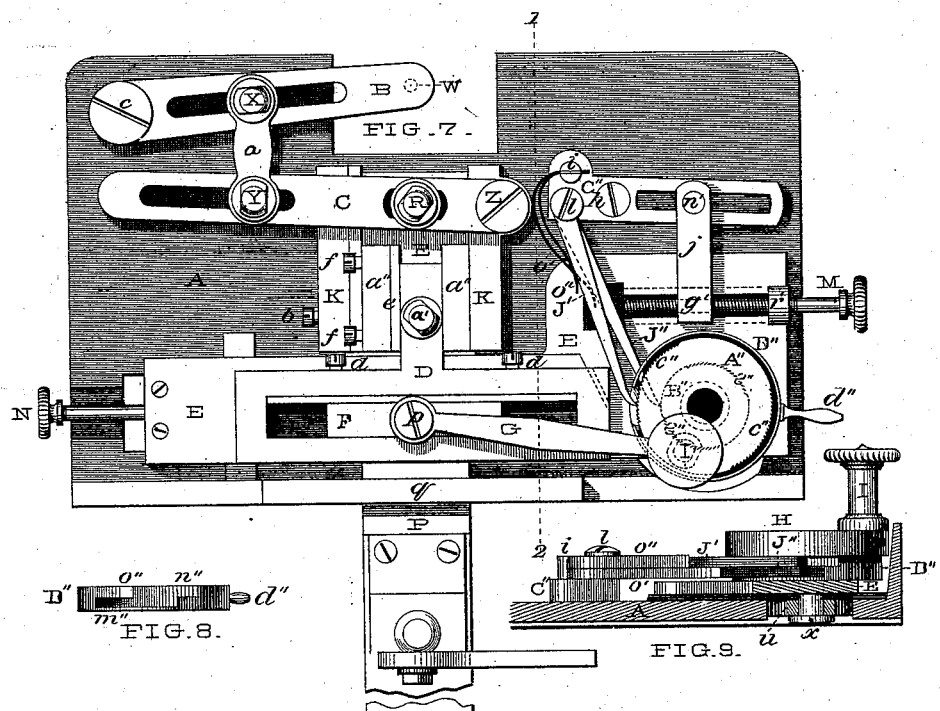
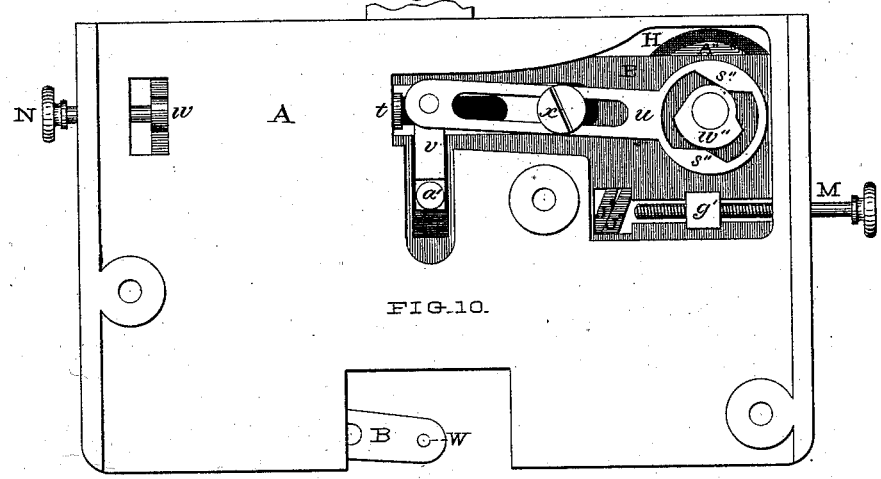
WITNESSES.
J. E. Schoonmaker
J. H. Riordan
INVENTOR.
George M. Morris
Joseph P. Hollenbeck
By N. Davenport atty

UNITED STATES PATENT OFFICE.

GEORGE M. MORRIS, OF COHOES, AND JOSEPH P. HOLLENBECK, OF TROY, ASSIGNORS TO EDWARD O. HOUSE, OF TROY, NEW YORK.

IMPROVEMENT IN BUTTON-HOLE ATTACHMENTS FOR SEWING-MACHINES.

Specification forming part of Letters Patent No. 203,287, dated May 7, 1878; application filed November 2, 1877.

*To all whom it may concern:*

Be it known that we, GEORGE M. MORRIS, of the city of Cohoes, county of Albany, and State of New York, and JOSEPH P. HOLLENBECK, of the city of Troy, county of Rensselaer and State of New York, have invented certain new and useful Improvements in Button-Hole Attachments for Sewing-Machines, of which the following is a full and exact description, reference being had to the acompanying drawings, and the letters of reference marked thereon, which form a part of this specification.

The nature of our invention consists in providing the feeding mechanism of a button-hole-stitching attachment with certain adjustable and automatic devices for stitching the button-hole entirely around in a uniform manner, and for stitching the ends in a thorough and proper manner, and without stopping the machine to readjust the fabric, and so that the stitching of the button-hole may be commenced at any point which may happen to be most convenient.

Considerable difficulty has been experienced in the use of this class of attachments on account of their delicate and complex mechanism, and their consequent liability to get out of repair; and the imperfect mechanism heretofore adopted for feeding the material operated upon rendered it frequently necessary to stop the machine before the button-hole could be completely finished. Further, many important parts of previously-existing machines have not been made to work automatically, and therefore the advantages in point of speed have not been sufficient to bring such attachments into general or successful use. To obviate these as well as minor difficulties is the object of one form of my invention.

Figure 1:
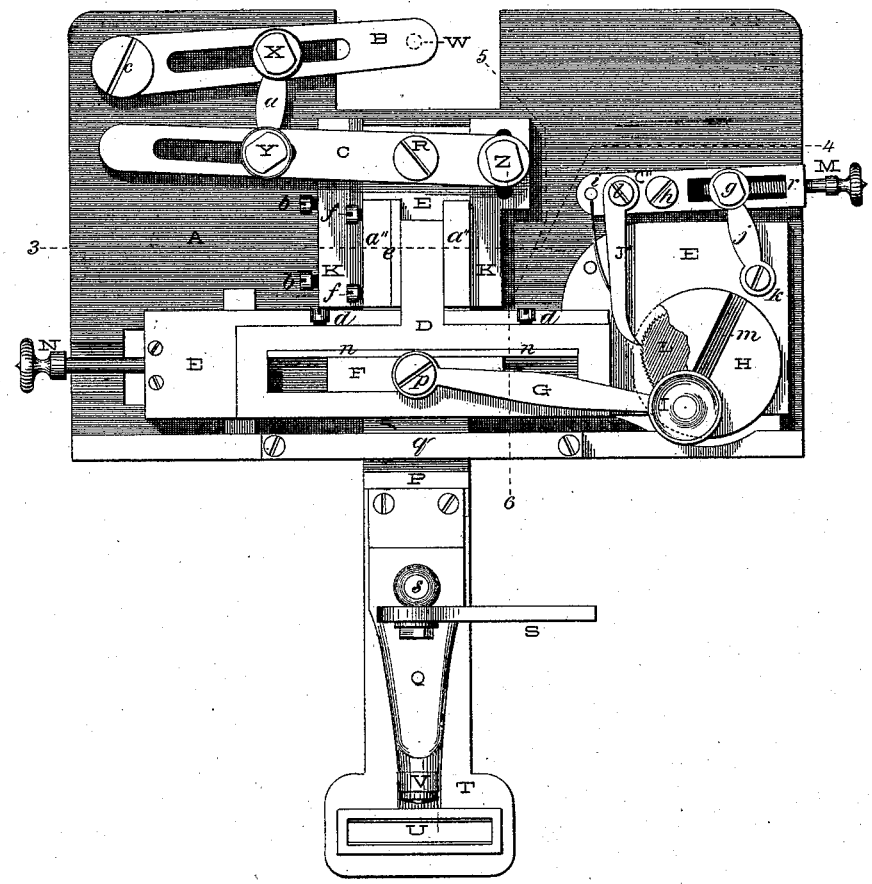
Figure 2:
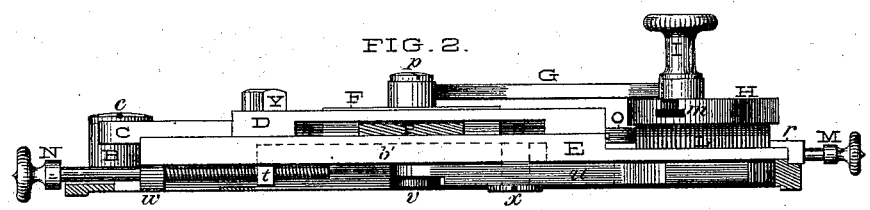
Figure 3:
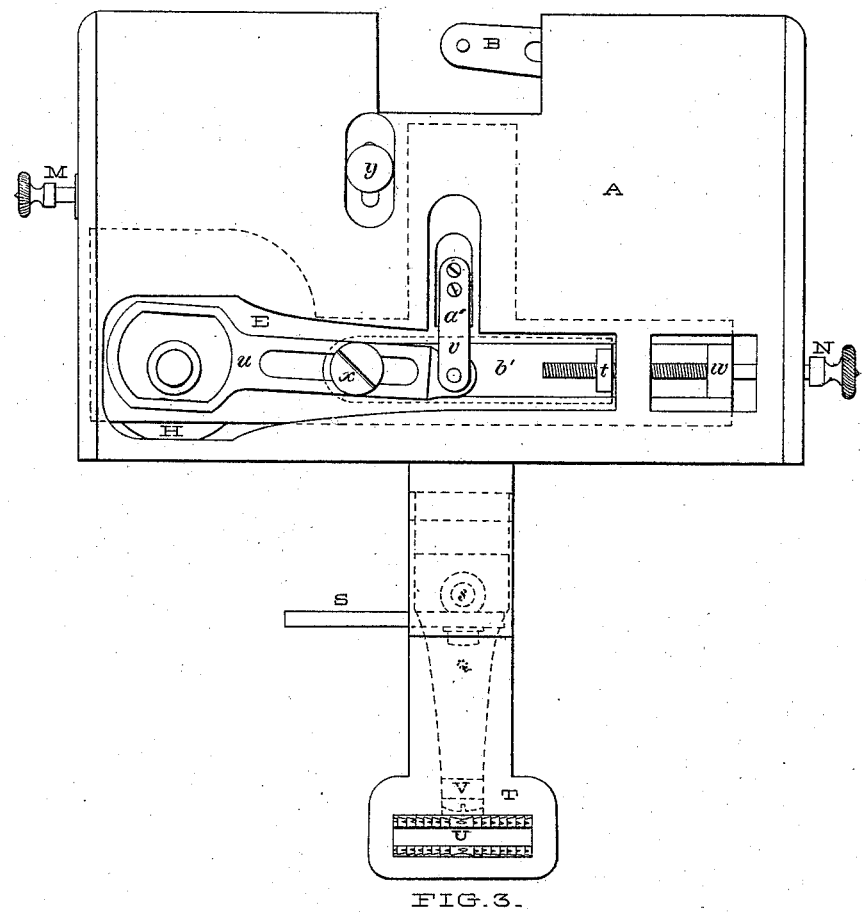
Figure 4:
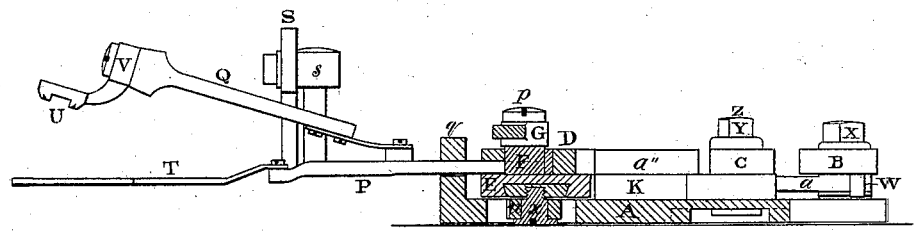
Figure 5:
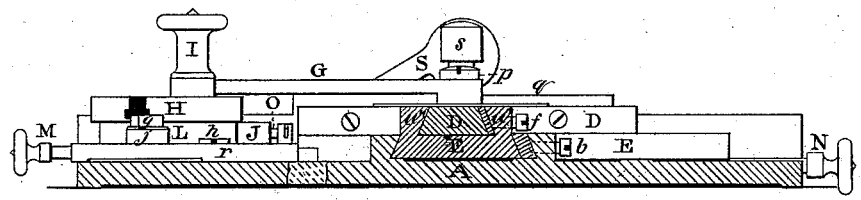
Figure 6:
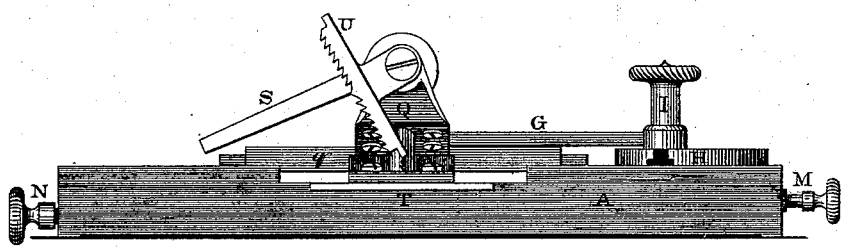

Figure 1 is a plan view of attachment, showing the parts above the bed-plate, with a portion of the crank-wheel broken away to show the teeth of the feeding-ratchet. Fig. 2 is a front or edge view, showing a portion of the adjusting mechanism and the crank-wheel and its pitman. Fig. 3 is a plan view of the under side of the attachment, showing more particularly the fulcrum-plate. Fig. 4 is a side elevation, showing the clamping device and other parts of the attachment. Fig. 5 is a view of the back part of the attachment. Fig. 6 is a front elevation, showing clamping device and its loose bearing. Fig. 7 is similar to Fig. 1, except that Fig. 1 shows the crank-wheel with the teeth of the feeding-ratchet set in the form of an ellipse, while in Fig. 7 the crank-wheel shows the teeth of the feeding-ratchet set in circles having different diameters. Fig. 8 is a view of the feed-stop detached. Fig. 9 is a view of the crank-wheel and other parts of the feeding device detached. Fig. 10 is a plan view of a portion of the under side of the attachment, showing more particularly the mechanism for giving the change-plate an independent motion, for the purposes hereinafter described.

A is the bed-plate of the attachment, to which the several parts are attached, and is adapted to be secured to the bed-plate of the sewing-machine in any convenient manner. B is a vibrating lever, pivoted at one end to the bed-plate, and having at its opposite end a cam-follower, W, against which a switch-cam upon the driving-shaft of the sewing-machine works, thereby imparting a vibratory motion to the lever, and through it to the various parts of the attachment.

C is a vibrating lever, having its inner end pivoted at Z to the bed-plate A, and is also attached, by a bolt or pin, R, to the sliding plate E, to which it imparts a reciprocating motion, being connected to lever B by the adjustable connecting-bar $a$. These two levers have longitudinal slots, in which the connecting-bar $a$ is adjustably secured by pins or bolts and nuts. As this bar is moved in the slots nearer to or farther from the sliding plate E, the width of throw or extent of motion of the plate E will be increased or diminished, thereby increasing or diminishing the width of the cloth under the needle.

The sliding plate E is gibbed in ways K K, which are cast on or secured to the bed-plate A, and receives its motion from the vibrations of the levers B and C, as described.

The change-plate D is gibbed in ways $a'' a''$, which are secured to plate E, and this change-plate receives a reciprocating motion from plate E. One end of knee-arm $v$ is attached to plate D, and the other end is connected with the cam-lever $u$ upon the under side of the bed-plate, as shown in Fig. 10. The position of the change-plate upon plate E is regulated by the cam $w''$, acting thereon through the lever $u$ and knee-arm $v$, as plainly shown in Figs. 3 and 10.

F is the feed-bar, gibbed in a slot in the change-plate D, and is connected by the pitman G to the hub I on the crank-wheel H, from which it receives a longitudinally-reciprocating motion while being carried laterally by the said change-plate D.

The pitman G, above mentioned, is attached to the feed-bar, and at its opposite end is attached to the hub I, which is adjustably secured in a slot in the crank-wheel H. By this adjustment of this pitman the feed-bar and its connecting mechanism are adjusted to the length of the button-hole to be worked. The nearer the hub is adjusted to the axis of the crank-wheel the shorter will be the throw of the feed-bar and the attached cloth-clamp U, and the shorter, necessarily, will be the lines of stretching.

The crank-wheel H, above mentioned, revolves upon a shaft projecting through one end of the sliding plate E. From this sliding plate said wheel H receives a lateral reciprocating motion. The wheel is caused to rotate by the following means: The wheel H is provided with one or more additional wheels on its under side, as shown at $A''$ and $B''$, Fig. 7; or, in lieu of the same, an ellipse may be employed, as at L, in Fig. 1. These are denominated "feed-wheels," and if two be employed they may be made circular. If one only be used it should be elliptical.

When two wheels are employed they are of different diameters, and have teeth upon their peripheries only partly around them, the remaining portions being made plain—i. e., without teeth. Into these teeth work the feed-dogs $J'$ $J''$, which are secured by pins to the short arm of the feed-lever $C''$, and held into the teeth by springs $O'$ $O''$. Feed-lever $C''$ is a slotted lever, pivoted, near its inner end, to the bed-plate. Into its slot is secured one end of an adjustable arm, $j$, the opposite end being secured in the plate E and made adjustable therein by a thumb-screw, M. From this plate the lever $C''$ gets a vibratory or swinging motion, and from thence the feed-dogs $J'$ and $J''$, working in the feed-teeth on the crank-wheel, give such crank-wheel a rotary motion.

It is obvious that while the crank-wheel may have a regular and uniform rotary motion when the attachment is in operation, yet it will not give through the pitman $G''$ a regular and uniform movement to the feed-bar F whenever the hub, to which one end of the pitman is attached, is adjusted at any point beyond the center of the crank-wheel; and it is further obvious that if adjusted to the center of the crank-wheel the feed-bar would get no throw, and consequently the stitches would all be made in one place.

To obviate these difficulties and to produce a sufficiently uniform stitch around the ends of the button-hole, we make these feed-wheels or circles $A''$ and $B''$ upon the crank-wheel, as described, each circle or feed-wheel having a different diameter, as shown in Fig. 7. The diameter of circle $A''$ is much greater than of circle $B''$.

Upon these circles are toothed and blank spaces, the teeth upon one circle being opposite the blanks upon the other, each circle having two equal toothed spaces and two equal blank spaces. The dog $J'$ works into the teeth upon circle $A''$, and the dog $J''$ into the teeth upon circle $B''$. The toothed and blank spaces are so arranged upon these circles or wheels that, when the pitman G is about to pass and passes the centers of the crank-wheel, as above described, the dog $J''$ falls into one of the toothed sections upon circle $B''$ while dog $J'$ is sliding over a blank section of circle $A''$. After passing either of these centers the dog $J'$ drops into one of the toothed sections upon circle $A''$ while dog $J''$ is sliding over a blank section upon circle $B''$. Circle $B''$ being of less circumference than circle $A''$, a greater arc on the crank-wheel will be made to pass a point by the action of the dog $J''$ against the teeth of the smaller circle $B''$, and this will be just enough greater to maintain an equal and uniform motion of the feed-bar, the circles having the proper circumferences, thereby making the stitches in the ends of the button-hole sufficiently uniform with the stitches in its sides. While we prefer this manner of arranging these teeth upon the crank-wheel, it is obvious that instead of two circles with teeth upon the crank-wheel, a toothed ellipse and a single dog might be made to produce a similar result, as shown in Fig. 1, at L, if the ellipse be made with great care and precision, and of the precise form required.

The fineness of the stitch is regulated as follows: M is a screw, secured in a sleeve on the sliding plate E, as shown in Fig. 7, and projecting through and working in one end of the connecting-arm $j$, where it is grooved into the plate E. The opposite end of the arm is held by a pin in a slot of the feed-lever $C''$. By means of this screw the arm $j$ may be adjusted at any point in the slot of the feed-lever and slot of the plate E, thereby changing in effect the length of the long arm of the feed-lever. The dogs $J'$ $J''$ being pivoted to the short arm of the feed-lever, the nearer the arm $j$ is moved to the fulcrum of this feed-lever the greater will be the number of teeth upon the circles $A''$ and $B''$ taken by the dogs with each swing of the feed-lever and the less speed given to the crank-wheel by each swing of the feed-lever, and consequently the finer or shorter must be the stitches around the button-hole.

The mechanism for moving the change-plate D and cloth-carrier and clamp attached thereto independently of the reciprocating motion received from the sliding plate E, for the purpose of carrying the unstitched side of the button-hole under the needle after one side has been stitched, is as follows: $u$ is a cam-lever on the under side of the bed-plate, (see Fig. 10,) having one end pivoted to the knee-arm $v$, which is secured to the change-plate, and near its center adjustably attached through a slot therein by a screw, $x$, as its fulcrum, to the fulcrum-plate $b'$. (Shown in Fig. 3.) The opposite end of the lever $u$ is spread out into a ring, having on its inner edges two projections, $S''$ $S''$. Within this ring is a cam, $w''$, attached to the lower end of the shaft of the crank-wheel H, which shaft is projected through the sliding plate E in such position that the cam will strike against one of the projections $S''$ $S''$ as the crank-wheel revolves, and, by means of the knee-arm $v$, to which the opposite end of the cam-lever is attached, will, at the right point, move the change-plate D and its attached cloth-clamp, so that the unstitched side of the button-hole will pass under the needles after one or both ends have passed under the needle.

This cam $w''$ is of such shape and so accurately adjusted that, whatever position it occupies in the ring of the cam-lever, it will bear against the two projections $S''$ $S''$, and thereby prevent any play or lost motion in the cam-lever. When the connecting-arm $a$ is adjusted to regulate the depth of stitch, it is, of course, necessary to adjust the throw or extent of motion of the change-plate so that the stitches will be made at a uniform distance from the slit upon both sides thereof.

This is accomplished as follows: N is a thumb-screw, held in position by a sleeve on the sliding plate E, and working into the fulcrum-plate $b'$ at $t$, (see Fig. 3,) above described. By turning this screw the fulcrum-plate (into which the screw $x$, as the fulcrum of the cam-lever $u$, is secured) will be moved nearer to or farther away from the knee-arm $v$. It will change the fulcrum of this cam-lever, so that the change-plate D, acted upon by this knee-arm, will be thrown over a less or greater extent, as may be required, to produce the stitches at the same distance from the button-hole slit on both sides thereof. F is the carrying-plate, connected to the feed-bar, and at its outer end to the cloth-plate T.

The outer end of the cloth-plate projects over the plate of the sewing-machine to the proper point, and has a rectangular opening through it, so that the fabric containing the button-hole may rest upon the cloth-plate of the sewing-machine. The fabric is here held in position by the clamp U, secured to the outer end of the clamping-lever Q, which lever is forced down and held in position by the small cam-lever S, which latter is attached to a hub, $s$, having a shaft passing through the lever Q, and secured to the carrying-plate P.

The inner end of the clamp-lever Q is attached to a steel spring which is secured to the carrying-plate, so that the cloth-clamp U will release the fabric when the pressure of the cam-lever S is removed, and the lever Q assumes an elevated position. (See Fig. 4.) This cloth-clamp U is an equalizing-clamp, and has teeth for holding the fabric in the ordinary form; but instead of being rigidly attached to the lever Q it has a loose bearing thereon, so that it will vibrate, and thereby equalize the pressure upon all parts of the fabric beneath it without regard to the unequal thickness of such fabric.

The fabric about the button-holes is frequently of unequal thickness, and the rigid clamp in ordinary use will not hold the fabric securely in proper position while the button-hole is being stitched. By the use of this equalizing-clamp this difficulty is entirely removed, as the clamp will adjust itself to the equal or unequal thickness of the cloth at both ends of the button-holes.

$D''$ is the stop-feed, is circular in form, and has sides, as shown in Fig. 8. It is placed just underneath the crank-wheel H, and surrounding circles $A''$ and $B''$. One side is cut away, so as to allow the feed-dogs $J'$ $J''$ to pass through it, and is so arranged that dog $J'$ will rest on the edge of it at $o''$, and the dog $J''$ on the edge of it at $m''$. By moving the handle $d''$, the edges $o''$ and $m''$ will be brought against dogs $J'$ $J''$, lifting them out of the teeth in the circles $A''$ and $B''$, allowing the crank-wheel H to be turned back by the handle on hub I, so that in case the thread breaks the work may be moved back without moving the crank-wheel entirely around to the required point.

The operation of our invention is as follows: The fabric in which the button-hole is to be stitched is secured on the cloth-plate T, as described, with the slit of the button-hole in the center of the rectangular opening in such plate. The sewing-machine being started, motion will be given to the switch-cam placed upon the driving-shaft of the machine, and from this, through the cam-follower upon lever B, a vibratory motion will be given to the levers B and C, and by them a reciprocating motion given to the sliding plate E and the various parts marshaled thereon, as described. This motion, transmitted to the cloth-plate and clamping device, as described, carries the button-hole back and forth under the needle, (the hub $I''$ having been first adjusted to correspond with the length of the button-hole to be stitched, as hereinbefore described,) in such manner that the needle will first pass through the slit of the button-hole, and next pass through the cloth at the edge of the slit, making one stitch of the button-hole, and so on alternately.

Before the needle can descend the second time through the slit the feed-dogs, moved as hereinbefore described, working into the teeth on the circles under the crank-wheel, give a rotary motion to the crank-wheel, and, through the pitman G and feed-bar F, move the cloth-plate just far enough (the distance having been regulated by the adjustment of the arm $j$, as heretofore described) for the succeeding stitch. This motion continues until one side of the button-hole is stitched, as hereinbefore described, when the cloth-carrier and attachments have arrived at the point where the pitman reverses the motion of the feed-bar. At this point the cam $w''$, attached to the shaft of the crank-wheel, will have reached one of the projections $S''$ in the lever $u$. The cam, working against one of these projections, moves forward or backward the knee-arm $v$, attached to the opposite end of this lever $u$, and by its attachment to the change-plate, hereinbefore described, will move such change-plate, and thereby throw the cloth-plate under the needle to the unstitched side in a position to be worked as before, the fulcrum-plate $b'$ having been properly adjusted, as hereinbefore described.

It will be observed that this change from side to side is so gradual that several stitches are made in the ends of the button-hole as the fabric is moved over, thereby thoroughly working and strengthening the ends of the button-hole.

The peculiar mechanism for, and manner of, working the ends of the button-hole have been fully described. After the button-hole has once passed entirely around under the needle the crank-wheel has, of course, made one entire revolution, leaving the button-hole in the same position it was when the stitching commenced, and the revolution of the button-hole under the needle will continue, and the button-hole be stitched around as many times as desired until the machine be stopped.

It will also be observed that if the button-hole be placed in its proper position on the cloth-plate, as hereinbefore described, the position of the cloth-plate will make no difference with the stitching, as the button-hole will be in proper position for the needle, and the stitching be as well commenced at one part of the button-hole as another.

It will be also observed that this device may be readily and simply adjusted to work button-holes of any reasonable size, and with such a stitch in degree of fineness and such depth of stitch as may be desirable; also, that after such adjustment the various parts of the device are automatic, and will perform their work by putting the machine in motion, as described.

Having fully described our invention, what we claim as new, and desire to secure by Letters Patent, is—

1. The combination, with the bed-plate A of a button-hole attachment and the sliding plate E gibbed thereon, and carrying the cloth carrier or clamp, of levers C and B, and mechanism, substantially as described, for operating the same, whereby the proper lateral reciprocating movement is imparted to the cloth carrier or clamp, substantially as specified.

2. The combination, with the laterally-reciprocating feed-bar, provided with a cloth clamp or carrier and a revolving crank-wheel, of a pitman for connecting the two, and mechanism, substantially as described, for operating said crank-wheel, whereby the proper longitudinal reciprocating motion is imparted to the cloth clamp or carrier, essentially as explained.

3. The combination of the crank-wheel H, and mechanism, substantially as described, for operating the same, with the longitudinally and laterally movable feed-bar P and the pitman G, uniting the two parts, as at $p$ and I, substantially as shown.

4. The combination, as before set forth, of a crank-wheel having feed-teeth arranged therein in circular form, one or more feed-dogs engaging with said teeth, and a feed-lever having an adjustable arm, connecting it with the sliding plate E, by means of which a uniform motion is imparted by the crank-wheel and pitman to the feed-bar, for the purposes explained.

5. The combination, as before set forth, of the feed-bar, a revolving crank-wheel having teeth arranged upon arcs of circles having different chords, feed-dogs engaging with said teeth, and mechanism, substantially as described, for operating said feed-dogs, and a pitman uniting said feed-bar and crank-wheel, for the objects named.

6. The combination of the crank-wheel, mechanism for revolving the same, and the change-plate D, with the cam $w''$ attached to the shaft of said wheel, and a lever connected with the said change-plate D by an arm, substantially as herein described, for the purpose of moving the change-plate, in order to bring the unstitched side of the button-hole under the needle at the proper time, for the objects named.

7. The combination, with the change-plate D and cam $w''$, of the cam-lever $u$, having an adjustable fulcrum, whereby the movement of the change-plate may be regulated, substantially as and for the purposes set forth.

8. The combination, as before set forth, of change-plate D, lever $u$, cam $w''$, knee-arm $v$, levers C B, and sliding plate E, for the purpose of carrying the unstitched side of the button-hole under the needle.

9. The combination, as before set forth, of feed-lever C'', dogs J' J'', toothed crank-wheel H, and the adjustable arm $j$, by which the fineness or closeness of stitch may be regulated, as explained.

In witness whereof we have hereto subscribed our names this 1st day of October, 1877.

GEORGE M. MORRIS.
JOSEPH P. HOLLENBECK.

Witnesses:
RICHARD A. HECKER,
ANDREW W. ROSS.